March 16, 1954   H. P. LUHN   2,672,286
TOTALIZING KEY PUNCH
Filed Dec. 31, 1951   4 Sheets-Sheet 1
FIG. 1
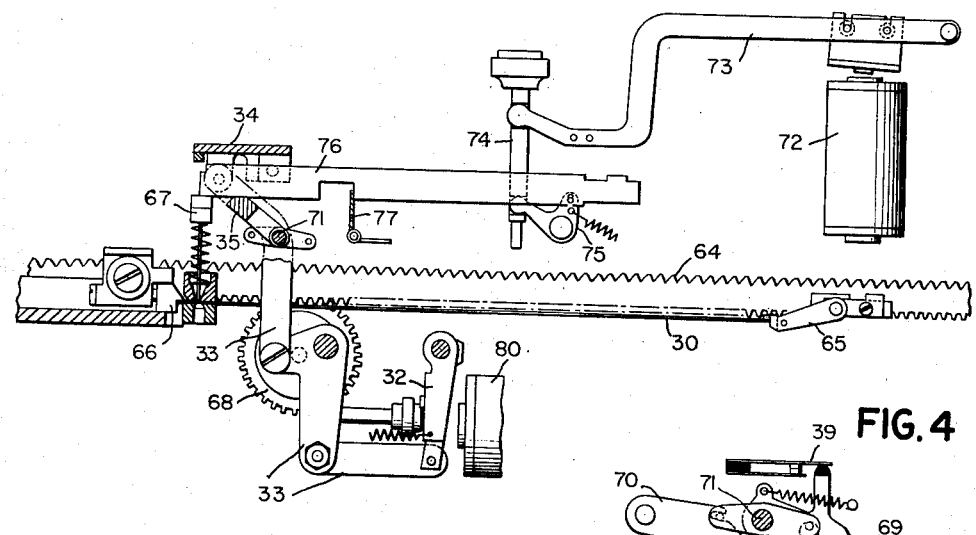
FIG. 4
FIG. 2
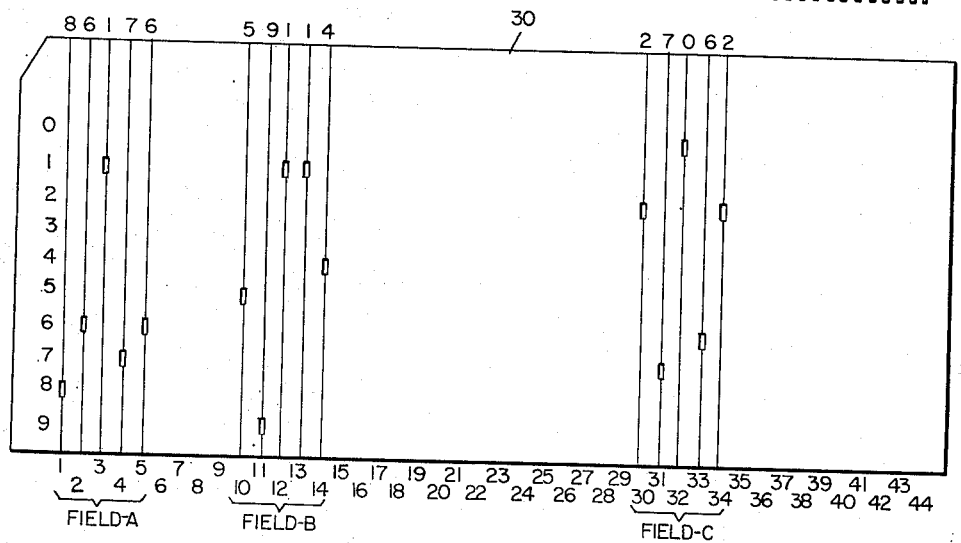
FIG. 3
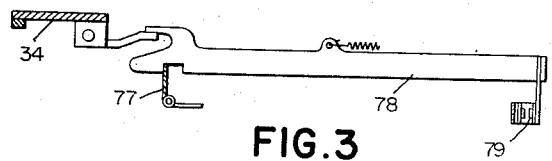
INVENTOR
HANS P. LUHN
BY
Charles E. McTiernan
ATTORNEY March 16, 1954

H. P. LUHN 2,672,286

TOTALIZING KEY PUNCH

Filed Dec. 31, 1951

INVENTOR
HANS P. LUHN
BY
Charles E. McTiernan
ATTORNEY

March 16, 1954  H. P. LUHN  2,672,286
TOTALIZING KEY PUNCH
Filed Dec. 31, 1951  4 Sheets-Sheet 4

INVENTOR
HANS P. LUHN
BY
Charles E. McTiernan
ATTORNEY

Patented Mar. 16, 1954

2,672,286

UNITED STATES PATENT OFFICE 2,672,286

TOTALIZING KEY PUNCH

Hans P. Luhn, Armonk, N. Y., assignor to International Business Machines Corporation, New York, N. Y., a corporation of New York Application December 31, 1951, Serial No. 264,328

8 Claims. (Cl. 235—61.6)

The present invention relates to a machine for producing the algebraic summation of two or more factors.

The principal object of the invention is to provide an electrical adding machine in which addition is performed by metering pulses to impulse accumulators as prescribed by amounts entered serially into code storage relays.

Another object of the invention is to provide an electrical adding machine in which a stepping switch controls the serial entry of a value into a storage unit and then effects parallel readout of the storage unit into impulse type counters.

A further object of the invention is to provide a device in which amounts are entered serially into storage relays on the basis of a self-complementary four element code and are added by metering out pulses as determined by the relay storage to impulse counters.

The instant invention is directed to an adding machine in which the amount to be added is entered serially under the control of a stepping switch into storage relays on the basis of a self-complementary four element code. Each digit of the amount is set up in combinational form on contacts controlled by the corresponding storage relays. The relay storage contacts are so arranged in conjunction with the contacts of the stepping switch so as to meter out pulses to the pertinent impulse counter pursuant to the amount entered in the storage relays.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a view of the essential parts of a record card punching machine.

Fig. 2 is a record card.

Fig. 3 is a detail of the interposer bail contacts and operating mechanism.

Fig. 4 is a detail of the escapement contacts and operating mechanism.

Figure 5A:
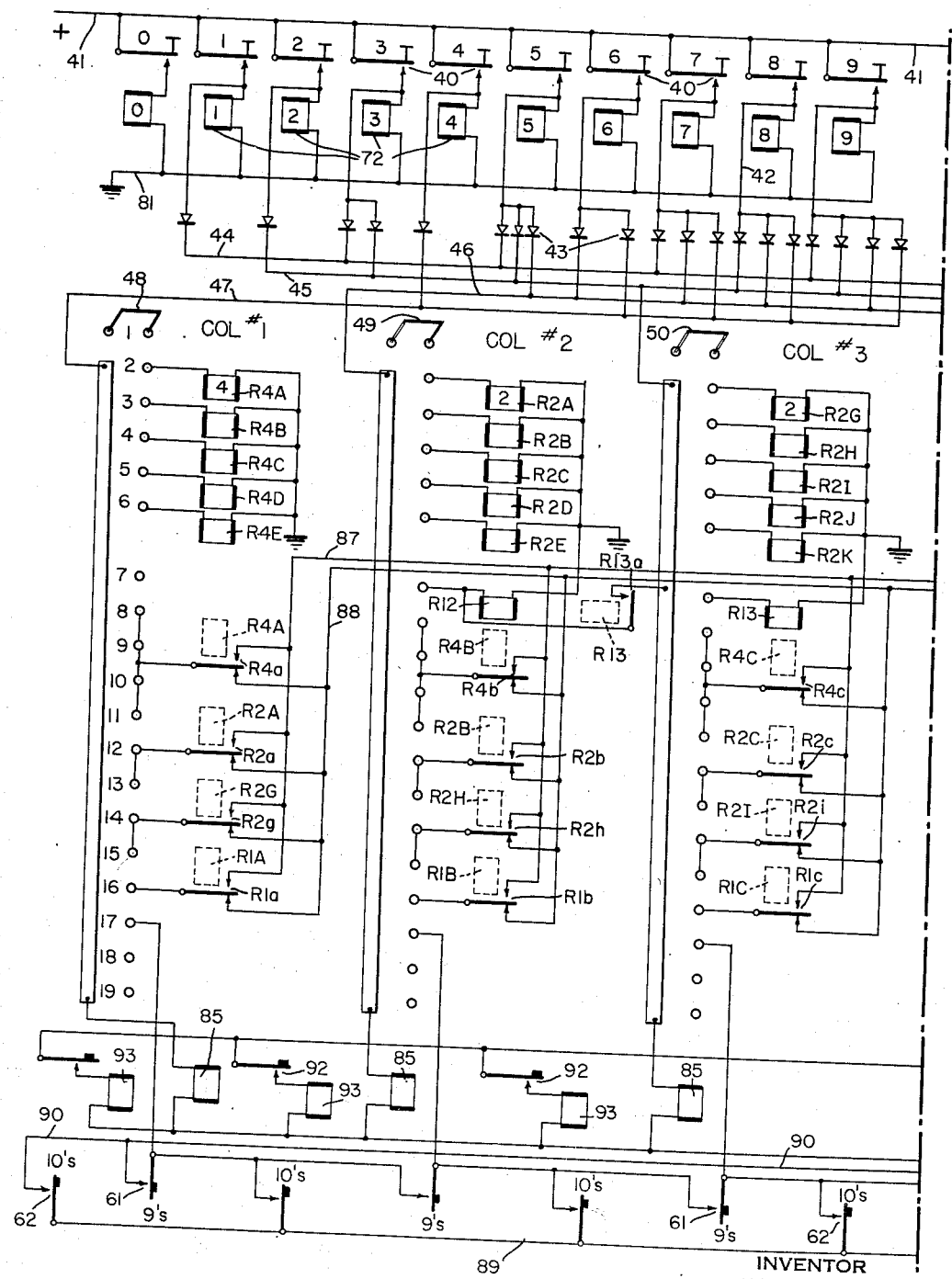
Figure 5B:
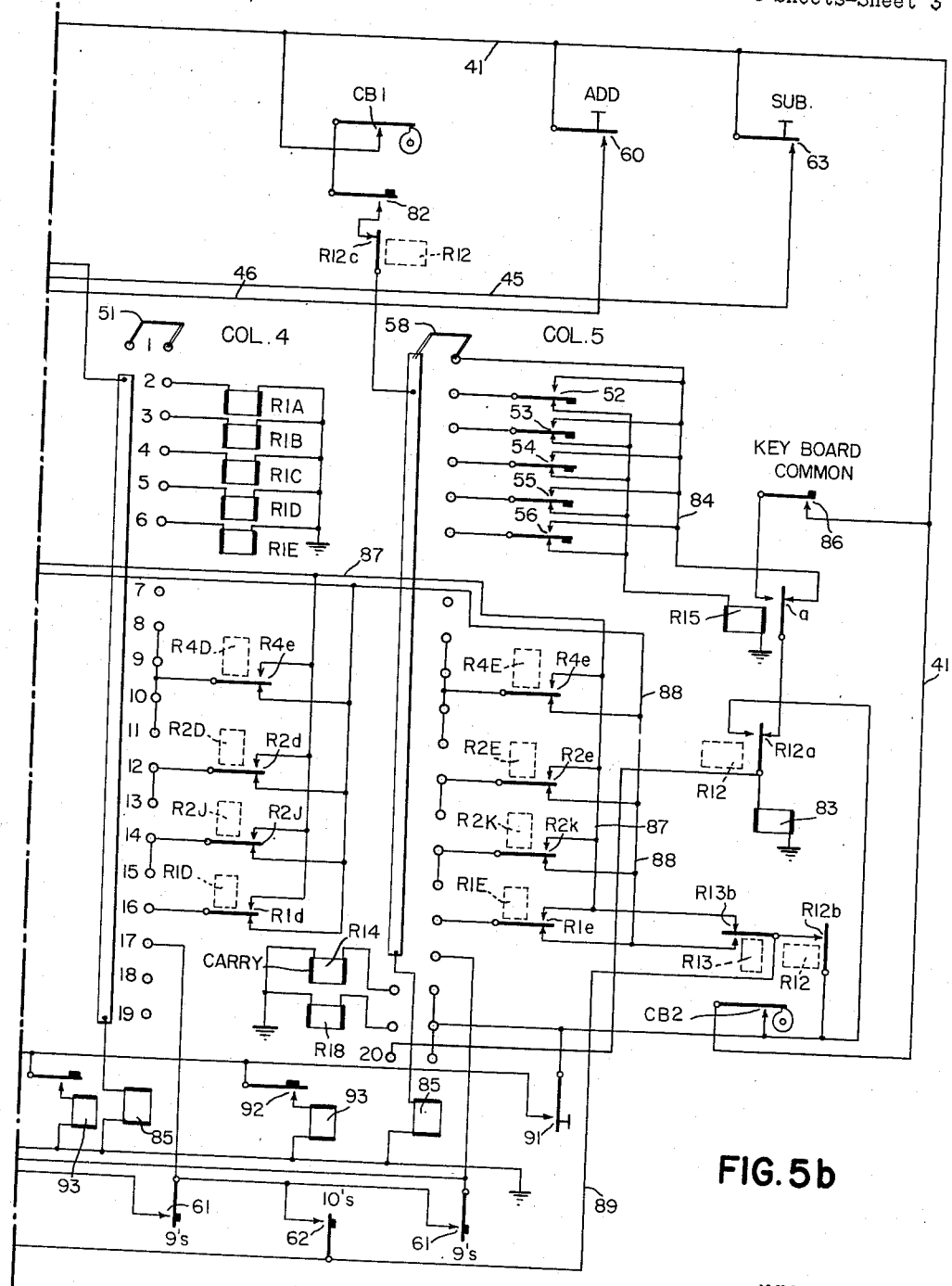

Figs. 5a and 5b placed side by side in the order named constitute a wiring diagram of the circuits of the device.

Figure 6:
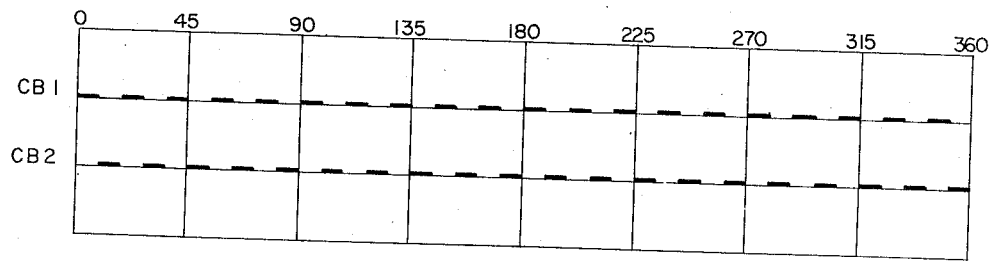

Fig. 6 is a timing diagram of the cam controlled contacts shown in the wiring diagram.

Figure 7:
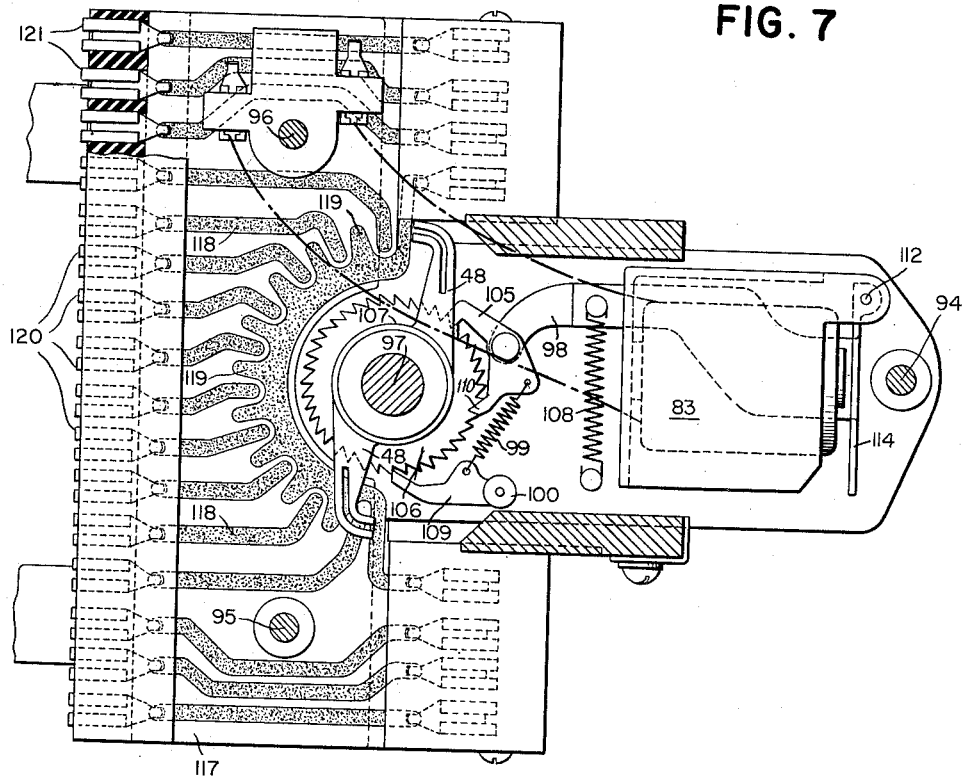

Fig. 7 is a view showing the stepping switch mechanism.

Card handling mechanism

The record card 30 (Fig. 2) is provided with columns of index point positions designated 0 to 9 in which digits are recorded by perforations made in appropriate positions. These columns are grouped into fields such as fields A, B and C and multidenominational amounts are recorded in such fields. In Fig. 2 the card is shown as having the amounts 86,176 and 59,114 punched in fields A and B respectively, and the algebraic summation of these amounts, 27,062, in field C. The blank card 30 is placed in the carriage of a well known type of punching machine which comprises a horizontally reciprocable rack 64 (Fig. 1) supporting a pusher 65 and a forward guide 66 between which the card 30 is held and moved step by step or column by column toward the left to bring each column in turn into line with a transverse row of punches 67. The rack 64 is geared to a spring drum 68 which normally urges the rack toward the left and an escapement device comprising stepping pawl 69 and holding pawl 70 control the rack's advance. When rod 71 (Fig. 4) is rocked counterclockwise, pawl 70 lowers into a rack tooth and pawl 69 is raised up and due to a loose fit on rod 71 the nose of pawl 69 moves slightly to the right under the influence of its spring so that when rod 71 is rocked back again pawl 70 is lifted up and pawl 69 engages the next rack tooth to space the rack one tooth or card column.

Magnet 72, of which there is one for each of the ten punching positions, will, when energized, rock lever 73, to depress key 74, which through bell crank 75 slides an interposer 76 to the left. Movement of interposer 76 will rock a plate 77 which through a hooked link 78 (Fig. 3) closes interposer contacts 79 to complete a circuit for punch magnet 80 (Fig. 1).

When magnet 80 is energized it attracts its armature 32 (Fig. 1) and through linkage 33 rocks bail 34 to force the left end of the advanced interposer 76 down against the related punch 67 and at the same time, interposer 76 rocks bail 35 on rod 71 to engage pawl 70 in a rack tooth. Rocking of bail 34 (Fig. 3) disengages link 78 from plate 77 so that contacts 79 reopen, deenergizing magnet 80 and allowing the parts to return to their initial positions and causing the carriage to advance one step.

This briefly is the operation of the punching mechanism, and where columns are to be skipped, the well known space key (not shown) is actuated to step the carriage without punching. The usual escapement contacts 39 (Fig. 4) are also provided and these are diagrammatically represented as controlled by pawl 69 so that they open during the carriage escapement and reclose when the carriage has completed its step of advance.

Referring now to Fig. 5a, there is provided, for the purposes of this invention, a set of digit representing, key actuated contacts designated 40. When any of these contacts is closed, it completes a circuit from line 41 coupled to the positive terminal of a source of potential (not shown), contacts 40, punch selector magnet 72 to line 81, which is coupled to the grounded or negative terminal of the source of potential, to cause punching of the related digit in the card column at the punching station. At the same time, as shall be described in more detail subsequently, a parallel circuit will be set up for temporarily storing the entered value.

Stepping switch

The stepping switch (Fig. 7) employed in the present invention is of the type having a multiple number of levels or columns of contacts with there being twenty steps or contacts positions for each column. This stepping switch is similar in construction to that switch shown in Fig. 33 of the applicant's copending patent application Serial No. 163,259 filed May 20, 1950, now Patent No. 2,615,626, with the exception that the switch shown here in Fig. 7 is magnetically driven. As described in the copending application, the advancement of the contactor for each column from step to step is caused by mechanical means under electromagnet control.

The stepping switch mechanism is illustrated in Figure 7 only sufficiently to enable the general operation of the mechanism to be understood, and reference should be made for a more complete description to the above mentioned copending application.

The stepping switch control and operating mechanism are contained between two plates (not shown) which are held in spaced relationships by the studs 94, 95, 96 and 97.

A magnet 83 is mounted between the supporting plates in an obvious manner. The armature 114 which is pivotally supported about the stud 112 has fixed thereto an arm 98 which through the spring 108 normally biases the armature away from the core of the magnet 83. The free end of the arm 98 pivotably supports a ratchet pawl 105. The pawl 105 is capable of engaging the teeth of a ratchet 106 fastened to a hollow shaft rotatably mounted on stud 97.

When the magnet 83 is energized, the armature 114 will be attracted thereto causing the arm 98 to move in a clockwise direction about the pivot 112 against the bias of the spring 108. The movement of the arm 98 will displace the tooth of pawl 105 a distance slightly more than the size of one tooth of the ratchet 106. The ratchet wheel 106 is prevented from following the movement of the pawl 105 by a dent 109 which is coupled to pawl 105 by the spring 99, and is pivotably carried at 100 by the supporting plate. In order to prevent rotation of the ratchet wheel 106 beyond the amount imparted by the movement of the arm 98, the pawl 105 has been provided with an extension 110 which because of its relative movement will be brought into engagement with a tooth remote from that engaged by the other arm of the pawl 105.

When the magnet 83 becomes deenergized, the arm 98 will be restored to its normal position by the spring 108 causing, as a result, the pawl 105 to step the ratchet 106 one position.

Associated with the hollow shaft 107 there are a plurality of wiper arms 48, 49, 50, 51 and 58 (only arms 48 are shown in Fig. 7), arranged in pairs, with each pair being interconnected electrically. The arms 48, 49, 50, 51 and 58 are insulated with respect to each other and with respect to the rest of the switching mechanism by mounting them on a dielectric sleeve and interspacing them with dielectric rings (not shown). All the wiper or contact arms rotate as one with hollow shaft 107 and ratchet wheel 106.

There is associated with each pair of wiper arms a commutator plate 117 consisting of a dielectric sheet onto both sides of which there are secured contacting elements 118. Each pair of wiper arms is arranged such that their ends may contact either sides of the corresponding commutator plate 117. A common circuit element 119 which also is mounted on each side of the plate 117 will be successively connected to the individual contact elements 118 as the associated wiper arms are stepped to each element 118. Each of contact elements 118 are connected to plugging units 120 in order to establish connection with external circuits while the plugging units 121 are used to establish electric connections to the electromagnet 83.

As shown in Figs. 5a and 5b, the respective wiper or contactors 48, 49, 50, 51 and 58 for the columns 1 to 5, inclusive, are in their home position when engaging the first step contacts 118. The contactors are advanced to the No. 2 contacts when the contacts 82 (Fig. 5b) are closed, thereby enabling the cam controlled contacts CB1 to apply an impulse to the stepping switch advance magnet 83 for energizing said magnet. The circuit for energizing the magnet 83 is traceable as follows: line 41, contacts CB1 now closed, contacts 82 now closed, normally closed contacts R12c, contactor 58 in the No. 1 step position, line 24, contacts R15a and R12a as shown, magnet 83 and then to ground. Upon the termination of the CB1 impulse, the magnet 83 will be returned to its deenergized state causing the contactors to shift to the No. 2 step in a manner as explained in the aforementioned copending application. The timing for the cam controlled contacts CB1 is shown in Fig. 6 while the operation of these contacts will be described more fully subsequently.

For the purpose of this application, the contacts 82 are assumed to be manually closed whenever a series of values is to be entered in the storage relays. It is obvious that contacts 82 could be closed by a program device, such as, for example, the program card described in the Gardinor et al. patent application Serial No. 103,224, filed July 6, 1949, now Patent No. 2,647,581.

The next six steps, steps 2 to 6, inclusive, for columns 1, 2, 3 and 4 are coupled to latch type relays which collectively form a relay storage unit. The relays coupled to the contacts Nos. 2 to 6 in column 1 are each equivalent to a 4 value; the relays coupled to the corresponding contacts in columns 2 and 3 are each respectively representative of a 2 value; while the relays coupled to the corresponding contacts in column 4 are each representative of a 1 value.

The value to be entered in the storage relays is entered by depressing the appropriate one of the keys shown in Fig. 5a. The entered value is converted to the 4, 2, 2, 1 code and stored in the relay storage unit. The values are entered in the relay storage unit such that the first value will be entered through the energization of the latch relays R4A, R2A, R2G and R1A in combination while, assuming five values, the last value will be combinationally entered in the latch relays R4E, R2E, R2K and R1E.

The fifth column contacts (Fig. 5b) for steps 2 to 6, inclusive, have associated therewith the respective contacts 52, 53, 54, 55 and 56. These contacts are manually controlled for the purpose of this application but, like contacts 82, they could just as well be controlled by a program device. When the contacts 52 to 56 are in the position shown in Fig. 5b the energization of the stepping magnet 83 is under the control of the keyboard. But by transferring any of these contacts a CB1 impulse will be applied direct to the magnet 83 causing the contactors to step to the next position following the transferred contacts.

The setting of these fifth column contacts determines the size of the field to be entered in the relay storage units. For example, if the size of the field to be stored comprised only two digits, the operator would initially transfer the contacts 52, 53 and 54. With contacts 52, 53 and 54 shifted, then the closing of contacts 82 would enable three successive CB1 pulses to be applied to the advance magnet 83 resulting in the contactors being positioned in step No. 5 position. The first digit of the two digit field will then be entered in the storage relays associated with step No. 5 positions of the columns 1, 2, 3 and 4.

Step No. 7 for columns 2 and 3 are respectively coupled to the add relay R12 and the subtract relay R13. These relays will become energized when either the add key contacts 60 or the subtract key contacts 63 (Fig. 5b) are closed when the contactors 49 and 50 are in step No. 7 position.

The energization of relay R12 will close the contacts R12b (Fig. 5b) which, in turn, will unblock the CB2 impulses causing the contactors to be successively stepped through positions 8 to 20 and the relay storage to be read out for each step. The contacts CB1 and CB2 are controlled by continually running cams in a well known manner. The contacts CB2 are ineffective until the relay R12 is energized at which time, due to the opening of contacts R12c (Fig. 5b), the CB1 impulses are made ineffective.

Referring now to column 1 (Fig. 5a), it is to be noted that the first factor which will be entered in relays R4A, R2A, R2G and R1A will be combinationally set up in the contacts R4a, R2a, R2g and R1a. These contacts when in the position shown in Fig. 5a will enable, as shall be described subsequently, the complement of the value entered in the storage relays to be read out by CB2 impulses. When any of these contacts are in a transferred position, a circuit will be completed for successively applying CB2 impulses to the add magnet 85 as the contactor is stepped from positions 8–16. Depending upon the condition of these contacts, it is to be noted as the contactor 48 is successively stepped from step No. 8 to 11, that a circuit will be completed through contacts R4a to the add magnet 85 causing the counter to be advanced four units; that when the contactor is stepped through positions 12 and 13, a circuit will be established through contacts R2a to the add magnet 85 causing the counter to be advanced two units; that when the contactor is stepped to positions Nos. 14 and 15, a circuit will be completed through the contacts R2g for advancing the counter two units; and that when the contactor is in position No. 16, a circuit will be completed through contacts R1a for advancing the counter one unit.

The counter, of which the add magnet 85 is a component part, is of the type shown and described in Patent No. 1,875,850, issued September 6, 1932 to Fred M. Carroll. As described in this patent, each time the add magnet 85 receives an impulse a ratchet wheel will be stepped one unit. For a more complete description of this counter, reference should be made to the aforementioned Carroll patent.

When the contactor 48 is in step No. 17 position, a carry operation will take place while when it successively assumes positions Nos. 18 and 19, the various carry contacts and latched relay contacts will be tripped while the contactor will be returned to its home position. These operations will be described subsequently in more detail with relation to a specific problem. When the contactor 58 of column 5 is advanced to position No. 20, the stepping switch will be moved to the No. 1 position.

*Problem*

It is believed that the applicant's device can be best described in reference to a specific problem wherein it will be assumed that the contacts 52 to 56 (Fig. 5b) are in the position shown. Taking the problem of Fig. 2 and assuming that contactors 48, 49, 50, 51 and 58 are in step No. 2 position, the record card is placed in position with its column 1 in line with the row of punches. Accordingly, with column 1 now in position, the operator now depresses the 8 key (Fig. 5c) to close the 8 contacts 40 and the effect of this to set up a pair of parallel circuits. The first circuit which is obvious will cause the energization of the 8 punch selecting magnet 72 which, in turn, will enable the punch magnet 80 to be energized thereby causing an 8 hole to be punched in column 1 of the card. The second circuit which is established will cause the keyed value to be stored in the appropriate relay storage positions. This circuit may be traced as follows: conductor 41 which is connected to the positive terminal of a potential source (not shown), the 8 contacts 40 now closed, conductor 42, the rectifiers 43, the respective lines 45, 46 and 47, the corresponding contactors 50, 49 and 48 in step No. 2 position, the corresponding relays R2G, R2A and R4A, and then to ground. With the energization of the storage relays the corresponding contacts R4a, R2a, R2g will be shifted and latched in this position. These contacts will be latched until the contactors are stepped to step No. 19 at which time they will be unlatched through the energization of the relay R18 (Fig. 5b).

When the operator depresses the 8 key, and with the CB1 contacts in a closed position, a circuit will also be established for energizing the stepping switch advance magnet 83 causing the contactors to shift to step No. 3 contacts position. This circuit may be traced as follows: line 41, cam controlled contacts CB1 now closed, contacts 82 now closed, normally closed contacts R12c, contactor 58 in step No. 2 position, contacts 52 as shown, the relay R15 and then to ground. When the relay R15 is energized the associated contacts R15a are transferred enabling an obvious circuit to be established through the now closed keyboard common contacts 86 for energizing the advance magnet 83. It is to be noted that the keyboard common contacts 86 are closed each time any of the key contacts 40 are closed in the usual and well known manner.

With the contactors 48, 49, 50 and 51 now in the step No. 3 contacts position, the depressing of a key to close the 6 contacts 40 will enable, in a manner as just described, the corresponding punch selector magnet to be energized, the relays R4B and R2B to be energized and the contactors to shift to step No. 4 contacts position. The energization of the keyboard storage relays of R4B and R2B will shift the contacts R4b and R2b.

After the thousands digit of the factor 86,176 has been entered in the keyboard storage relays the operator will depress a key to close the 1 contacts 40. This operation will result in the corresponding punch selector magnet 72 and the storage relay R1C being energized, as well as causing the contactor to shift to step No. 5 contacts position. The operator will then cause the tens digit to be stored in the keyboard storage relays R4D, R2D and R1D by depressing a key to close the 7 contacts 40. The depressing of the key at this time will energize the associated punch selector magnet and cause the contactors to move to step No. 6 contacts position. The energizing of these storage relays will result in the corresponding contacts R4d, R2d and R1d being transferred and latched in that position. Similarly, the units digit of the factor 86,176 will be entered in the relays R4E and R2E, the associated contacts R4E and R2E will be transferred, and the contactors will be stepped to step No. 7 position.

While the contacts of the rotator control column No. 5 are shown as being manually settable, it is well to point out that it is wholly within the scope of the invention that these contacts be under the control of some programming device such as, for example, the program card disclosed in the patent application of Gardinor et al., Serial No. 103,224, filed July 6, 1949. It is also to be realized that if the accumulate field contained only two digits, the switches 52, 53 and 54 would be set to cause direct energization of the advance magnet 83 prior to the entering of two digits into the storage relays.

Thus, at this stage, the factor 86,176 is stored in the storage relays such that the digit 8 is now stored in the keyboard storage relays R4A, R2A and R2G, the digit 6 in relays R4B and R2B, the digit 1 in the relay R1C, and the digit 7 in the relays R4D, R2D and R1D, and the digit 6 in relays R4E and R2E.

Since the amount entered in the storage relays is to be added, the add key will now be depressed closing the contacts 60 (Fig. 5b). The contacts 60 when closed will enable an obvious circuit to be established through column No. 2 contactor 49 in the 8 contacts position to energize the latch type add relay R12 (Fig. 5a). The energization of the add relay R12 will close the contacts R12b (Fig. 5b), transfer the contacts R12a (Fig. 5b), and open the contacts R12c causing these contacts to be latched in their respective positions. With the contacts R12a now in a transferred position, a circuit will be established for applying a series of impulses by the cam controlled contacts CB2 to the stepping switch magnet 83 in order to step the contactors through the remaining steps 7 to 20 inclusive. The circuit established for applying the pulses to the stepping switch advance magnet 83 is traceable as follows: line 41, cam controlled contacts CB2 now closed, contacts R12a shifted, advance magnet 83 and then to ground. Upon the termination of the CB2 pulse the advance magnet 83 will be deenergized at which time the contactors will be shifted to the 8 contacts position. The same operation will take place for the next twelve impulses causing the contactors to be successively stepped through the remaining contacts positions. The opening of contacts R12c will render the CB1 impulses ineffective placing further stepping of the respective contactors under the control of the CB2 impulses as just explained.

When the contactor assumes contacts position 8 the storage relays will be read out. For example, with the column No. 1 contactor 48 in contacts position 8, the storage relays containing the highest order digit will be read out as follows: line 41, CB2 contacts now closed, contacts R12b now closed, R13b as shown, conductor 87 (Fig. 5b to Fig. 5a), contacts R4a transferred, contactor 48 in the 8 contacts position, the add magnet 85 of column No. 1 and then to ground. The feeding of this pulse to the add magnet will cause it to be stepped to the "1" position thereby registering this impulse. When the contactor is successively moved to contacts 9, 10 and 11, a CB2 impulse will be applied through the contacts R4a in a similar manner to the add magnet 85. Similarly successive pulses will be applied to the add magnet under the control of contacts R2a as will be the case with respect to the contacts R2g.

With reference to column No. 1, when the contactor 48 is in the 15 contacts position, a series of eight pulses will have been registered in the add magnet with four pulses being applied through contacts R4a, two pulses through R2a, and two pulses through contacts R2g. When the contactor is shifted to the 16 contacts position an open circuit condition will exist due to the fact that the contacts R1a have not been transferred. In each case, however, the CB2 impulse will be applied to the stepping switch advance magnet 83 such that in the 17 contacts position a carry operation will take place if such is called for at this time. It is to be realized that concurrently with the reading out of the highest order that the remaining orders or columns will likewise be read out.

As is well known and described in the C. D. Lake Patent No. 2,480,744, issued August 30, 1949, when the respective counters pass through the nines and tens positions, contacts 61 and 62 (Figs. 5a and 5b) close so that a carry operation will take place when the respective contactors 48, 49, 50, 51 and 58 are switched to step No. 17 contacts position. Inasmuch as in the problem assumed a carry operation does not take place at this time, the description of the carry circuit will be deferred till after the second factor has been entered.

As previously described, with the respective contactors in contacts position 17, a CB2 impulse will be applied through contacts R12a directly to the advance magnet 83 causing the contactors to be stepped to position 18. With the contacts in position 18 a CB2 impulse will be applied directly to the carry trip coil R14 (Fig. 5b) to reset all of the tens contacts 62 in a manner similar to that shown in the aforementioned Lake patent. The relay R14 collectively represents five carry trip coils each of which is operably associated with the corresponding impulse counter for each column to cause the unlatching of the respective tens contacts 62.

After the contactors have been stepped to the next contacts position a CB2 impulse will be applied directly to the relay R13 (Fig. 5b) which, upon being energized, will clear all of the adding controls by unlatching the various latched elements. With the contactor 58 now stepped to contacts position No. 20, a circuit will be established for applying a CB2 impulse to the magnet 83 in order to home the contactors to the No. 1 position. This circuit is necessary inasmuch as the contacts R12a have been restored to the position shown. Thus, after the various contactors have been returned to their original home position there will have been entered in the counters the factor 86,176. For the purpose or simplicity the relay R18 collectively represents a tripping coil operably associated with each of the storage relays, the add relay R12 and the subtract relay R13. It is to be understood that when the fifth column contactor 58 is stepped to step No. 19, the trip coil associated with each of the latched relays will be energized causing the corresponding contacts to be restored to a normal position in a well known manner.

The next factor to be entered is 59,114 as shown in field B of the record card (Fig. 2) which is to be subtracted from the amount standing in the counter. This second factor will be entered and stored in the appropriate storage relays in a manner similar to that described for entering the factor 86,176. Subtracting operations are performed by the complemental process, that is to say, a digit is entered in each counter which is the nines complement of the digit entered in the storage relays. Thus, it is believed sufficient to state after entering the amount 59,114 in the storage positions and with the contactors now in step No. 7 position, that in the first column the storage relays R2A, R2G and R1A will be energized, in the second column storage relays R4B, R2B, R2H and R1B will be energized, in the third column storage relay R1C will be energized, in the fourth column storage relay R1D will be energized, and in the fifth column storage relay R4E will be energized.

Now, since the second factor is to be subtracted from the first factor, the operator will depress the subtract key closing the contacts 63 (Fig. 5b) which will establish an obvious circuit for energizing the relay R13. The contacts R13a which will be latched when the corresponding relay is energized will, in turn, cause the relay R12 to be energized. The relay R12 will transfer the contacts R12a enabling a circuit to be established for applying a CB2 impulse to the advance magnet 83 thereby causing the contactors to be stepped to position 8. As previously described, a CB2 impulse will successively step the respective contactors to positions 9 to 20, while concurrently causing the storage relays to be read out for each step.

With the relay R13 energized, the counter units will now be impulsed in accordance with the complement of the number that had been entered in the relay storage positions. As an example, this operation may be described with particular reference being made to the readout arrangement of the column No. 1. It is to be recalled that the contacts R2a, R2g and R1a are all shifted because the associated relays have been energized.

Now when the contacts R12b (Fig. 5b) are latched and R13b are transferred and with contactor 48 in step 8 position, a CB2 impulse will be applied to the add magnet 85 of column No. 1 causing this counter to be stepped to add a count of 1 to the previously entered count of 8 standing in the counter. The circuit enabling this operation to take place may be traced from the now closed CB2 contacts as follows: contacts R12b now closed, R13b transferred, line 88, contacts R4a as shown, contactor 48 in the 8 step position, the add magnet 85 and then to ground. For each of the contacts positions 8 to 11 which are successively coupled to the contacts R4a, a pulse will be applied to the add magnet 85 causing this counter, which originally had an 8 entered therein, to pass through zero to close the corresponding tens contacts 62 and to finally register a count of 2. Inasmuch as the remaining relay contacts R2a, R2g and R1a are all transferred, no further pulses will be applied to the add magnet 85 in column No. 1 when the contactor 48 is stepped through steps 13 to 17 inclusive.

The remaining columns 2, 3, 4 and 5 will be read out in a similar fashion. Thus, with the respective contactors now in step No. 16 position, the corresponding counters for columns 1, 2, 3, 4 and 5 will have entered therein the values 2, 6, 9, 5 and 1 with the tens contacts 62 for columns 1, 4 and 5 being closed while the nines contacts 61 for the column 3 will be closed.

With the contactors now being stepped to contacts position 17, a carry operation will take place in which the "fugitive one" will be entered in the add magnet of column 5 while the corresponding counters of columns 2, 3 and 4 will be moved one additional unit.

The circuit established for entering the "fugitive one" in the counter of column 5 is traceable as follows: CB2 contacts now closed, contacts R12b now closed, line 89, tens contacts 62 for column No. 1, line 90, contactor 58 in step No. 17 position, add magnet 85 of column No. 5 and then to ground. Thus, this counter will now be stepped one unit to register the value 2.

The circuit established for advancing the column 4 counter during this carry operation is traceable as follows: CB2 contacts now closed, contacts R12b now closed, line 89, tens contacts 62 of column No. 5, contactor 51 of column No. 4 in step No. 17 position, the corresponding add magnet 85 and then to ground. The completion of this circuit will step the column No. 4 counter from a 5 to a 6 position.

The circuit established for advancing the columns 2 and 3 counters during the carry operation may be traced as follows: CB2 contacts now closed, contacts R12b now closed, line 89, tens contacts 62 of column No. 4, now closed, a parallel circuit consisting of contactor 50 of column No. 3 in the step No. 17 position, corresponding add magnet, and the now closed nines contacts 61 of column No. 3, contactor 49 of column No. 2, corresponding add magnet, and then to ground. This CB2 impulse which is applied to the respective add magnets of columns 2 and 3 will cause each of the associated counters to be stepped one additional unit to respectively register the values 7 and 0.

Thus, after the contacts are stepped to step No. 18, the respective counters for the columns 1, 2, 3, 4 and 5 will register the sum of the two factors which will be 27,062.

The remaining operations associated with the contactors being stepped to contacts positions Nos. 18, 19 and 20 have been described and will not be repeated here.

While it is not shown it is obvious in order to secure representation of the digits of a sum standing in each counter that a total readout means such as described in the aforementioned Lake patent may be employed.

Resetting of the counters may be brought about by closing the reset control contacts 91 (Fig. 5b). The closing of contacts 91 will enable a series of CB2 impulses to be applied to the respective reset coil 93 of each coil through the corresponding reset contacts 92. The reset contacts 92 are normally closed when the counter is registering any value from 1 to 9, and open when the counter registers 0. Thus, for example, in order to reset the column No. 2 counter which has a 7 entered therein, a series of three CB2 impulses will be applied through the corresponding reset contacts to the reset coil of column No. 2 to step this counter to zero. When the counter registers zero, the reset contacts 92 will open thereby preventing further CB2 impulses being applied to the particular reset coil.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an apparatus of the class described, an impulse counter, a group of code relays, means for entering a factor in said relays through the energization of said relays either singly or in combination, corresponding contacts for each of said relays and settable to represent said factor, impulse means, contacting means, a plurality of contacts positions, means for coupling a number of said positions to each said contacts where said number is equal to the coded value of said contacts, and means for selectively applying impulses from said impulse means through said positions to said impulse counter as determined by said contacts, said impulse counter registering the number of pulses equal to said factor.

2. In an apparatus of the class described, a factor receiving device comprising a set of four relays respectively representative of the digits 4, 2, 2 and 1, means for entering a factor in said device through the energization of said relays either singly or in combination, an impulse counter, pulse means, contact means for each of said relays and settable for representing said factor, said pulse means being coupled to said contact means, switch means having a contactor operated step by step to successive contacts positions, said contact means for each of said relays being coupled to said contacts positions, each of said contact means being coupled to a number of said contacts positions equal to the digit represented by said respective contact means, said pulse means applying pulses to said counter as said contactor is advanced step by step as determined by said contact means, said counter receiving a number of pulses equal to the factor entered in said relays.

3. In an apparatus of the class described, an entry receiving device comprising a plurality of contacts settable singly or in combination to represent the digits 1 to 9, each of said contacts having a normal and a transferred position where said contacts are considered in a set position when transferred, contacting means adapted to be operated step by step to successive contacts positions, each of said plurality of contacts positions being coupled to a number of said contacts positions equal to the digit represented by said contacts, and means for causing, as said contacting means is advanced step by step, the reading out of the number as represented by said contacts being in a transferred position or the complement of the number as represented by said contacts being in the normal position thereof.

4. In an apparatus of the class described, an entry receiving device comprising a set of four relays each having a set of contacts operably associated therewith, said relays being respectively representative of the digits 4, 2, 2, and 1, means for entering a value in said relays through the energization thereof either singly of in combination, pulse means coupled to said contacts, an impulse counter, contacting means adapted to be operated step by step to successive contacts positions, means electrically interconnecting said contacts to a number of said contacts positions equal to the digit represented by the corresponding one of said associated relays, means for causing said contacting means to be advanced step by step, said advancing contacting means enabling said pulse means to be applied to said counter for each one of said contacts positions coupled to said contacts associated with an energized relay, said counter registering a number of pulses equal to the value entered in said relays.

5. In an apparatus of the class described, a group of four contacts settable to represent a value in code and respectively representative of the digits 4, 2, 2 and 1, discrete pulse means, an impulse counter, said pulse means being coupled to said contacts, a plurality of normally open connections, one side of each of said connections being commonly coupled to said impulse counter, the other side of each of said connections being separately connected in groups of 4, 2, 2 and 1 to the corresponding one of said contacts, contacting means adapted to be advanced step by step to close said open connections, said advancing contacting means causing said pulse means to apply separate impulses to said counter equal in number to the value set on said contacts.

6. In an apparatus of the class described comprising a set of denominationally order settable elements each comprising a plurality of contacts respectively representative of the digits 4, 2, 2 and 1 settable either singly or in combination to represent a multidenominational amount, stepping switch means for each said elements including contacting means and a plurality of successive contacts positions, means for coupling an equivalent number of said contacts positions to respective ones of said positions, an impulse counter associated with each said elements, means for advancing said contacting means step by step for reading out through said positions the number set in said contacts, and carry means coupled to one of said contacts positions for enabling a carry operation to be carried out when said contacting means is advanced to said one of said positions.

7. In an apparatus of the class described, a plurality of contacts settable singly or in combination to represent the digits 1 to 9, contacting means adapted to be operated step by step to successive contacts positions, said contacts positions being coupled to respective ones of said settable contacts, the number of positions coupled to the corresponding one of said settable contacts being equal to the digit representation of said settable contacts, and means for advancing said contacting means step by step for reading out through said positions the number entered in said settable contacts.

8. In an apparatus of the class described, a plurality of contacts settable singly or in combination to represent the digits 1 to 9, contacting means adapted to be operated step by step to successive contacts positions, certain of said positions being coupled to respective ones of said settable contacts, the number of positions coupled to the corresponding one of said settable contacts being equal to the digit representation of said settable contacts, an impulse counter, means for advancing said contact means step by step for reading out through said positions and into said counter the number entered in said settable contacts.

HANS P. LUHN.

References Cited in the file of this patent

UNITED STATES PATENTS

| Number | Name | Date |
| --- | --- | --- |
| 2,099,754 | Robinson | Nov. 23, 1937 |
| 2,206,660 | Bryce | July 2, 1940 |